United States Patent
Turley et al.

(10) Patent No.: US 7,538,794 B2
(45) Date of Patent: May 26, 2009

(54) METHOD AND APPARATUS FOR MOTION ESTIMATION IN A DIGITAL IMAGING DEVICE

(75) Inventors: Richard Turley, Ft. Collins, CO (US); Dan Dalton, Greeley, CO (US); Daniel Bloom, Loveland, CO (US); Gregory V. Hofer, Loveland, CO (US); Casey L. Miller, Fort Collins, CO (US); Scott Woods, Bellvue, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 562 days.

(21) Appl. No.: 11/048,403

(22) Filed: Jan. 31, 2005

(65) Prior Publication Data

US 2006/0170780 A1    Aug. 3, 2006

(51) Int. Cl.
    *H04N 5/228*    (2006.01)
(52) U.S. Cl. .............. 348/208.1; 348/208.4; 348/208.6; 348/208.11; 348/208.13
(58) Field of Classification Search .............. 348/208.1, 348/323, 311, 208.4, 208.6, 208.11, 208.13
    See application file for complete search history.

(56) References Cited

U.S. PATENT DOCUMENTS

| | | | | |
|---|---|---|---|---|
| 5,550,595 | A * | 8/1996 | Hannah | 348/552 |
| 5,990,952 | A * | 11/1999 | Hamasaki | 348/311 |
| 6,320,618 | B1 * | 11/2001 | Aoyama | 348/335 |
| 6,437,306 | B1 * | 8/2002 | Melen | 250/208.1 |
| 7,010,174 | B2 * | 3/2006 | Kang et al. | 382/274 |
| 7,061,524 | B2 * | 6/2006 | Liu et al. | 348/208.4 |
| 2003/0095189 | A1 * | 5/2003 | Liu et al. | 348/208.4 |
| 2004/0218830 | A1 * | 11/2004 | Kang et al. | 382/274 |
| 2005/0243195 | A1 * | 11/2005 | Parks | 348/311 |

FOREIGN PATENT DOCUMENTS

| | | | |
|---|---|---|---|
| JP | 2000050151 | A | 2/2000 |
| JP | 2000341582 | A | 12/2000 |

OTHER PUBLICATIONS

Matsushita Electric Corporation of America (2004). Fixed Color Cameras General-Purpose Solutions. Panasonic Security Products-Cameras. Retrieved on Mar. 3, 2005 (1 pg).
Lodriguss, Jerry. (2004). Combining 2 Different Exposures via Layer Masks. Catching the Light. Retrieved on Mar. 3, 2005. (10 pgs.).
El Gamal, Abbas. (2002). High Dynamic Range Image Sensors. Stanford University Dept. of Electrical Engineering. Retrieved on Mar. 3, 2005. (62 pgs.).
Kavusi, Sam, et al. Quantitative Study of High Dynamic Range Image Sensor Architectures. Stanford University Dept. of Electrical Engineering. Retrieved on Mar. 3, 2005.
Dalton, Dan, et al. (2004). Method and Device for Adjusting White Balance. Filed with PTO on Jul. 19, 2005 as U.S. Appl. No. 10/894,780. (27 pgs.).

* cited by examiner

*Primary Examiner*—David L Ometz
*Assistant Examiner*—Usman Khan (57) ABSTRACT

A digital imaging device having a CCD sensor array with one or more fields captures both short and long exposures of a particular field during the capture of a single image frame. The short-exposure image data and the long-exposure image data from the particular field may be correlated to estimate motion within the image frame.

13 Claims, 12 Drawing Sheets

METHOD AND APPARATUS FOR MOTION ESTIMATION IN A DIGITAL IMAGING DEVICE

RELATED APPLICATIONS

The instant application is related to "Method and Apparatus for Exposure Correction in a Digital Imaging Device," Hewlett-Packard Company Ser. No. 11/048,324, which was filed on the same day as the instant application.

FIELD OF THE INVENTION

The present invention relates generally to digital photography and more specifically to techniques for estimating motion in a digital imaging device.

BACKGROUND OF THE INVENTION

Blurred images due to camera motion, object motion, or both are a common problem in still photography, including digital still photography. Deblurring algorithms exist, but such algorithms may require an estimate of the motion within the frame.

It is thus apparent that there is a need in the art for an improved method and apparatus for motion estimation in a digital imaging device.

DETAILED DESCRIPTION OF THE INVENTION

Figure 1A:
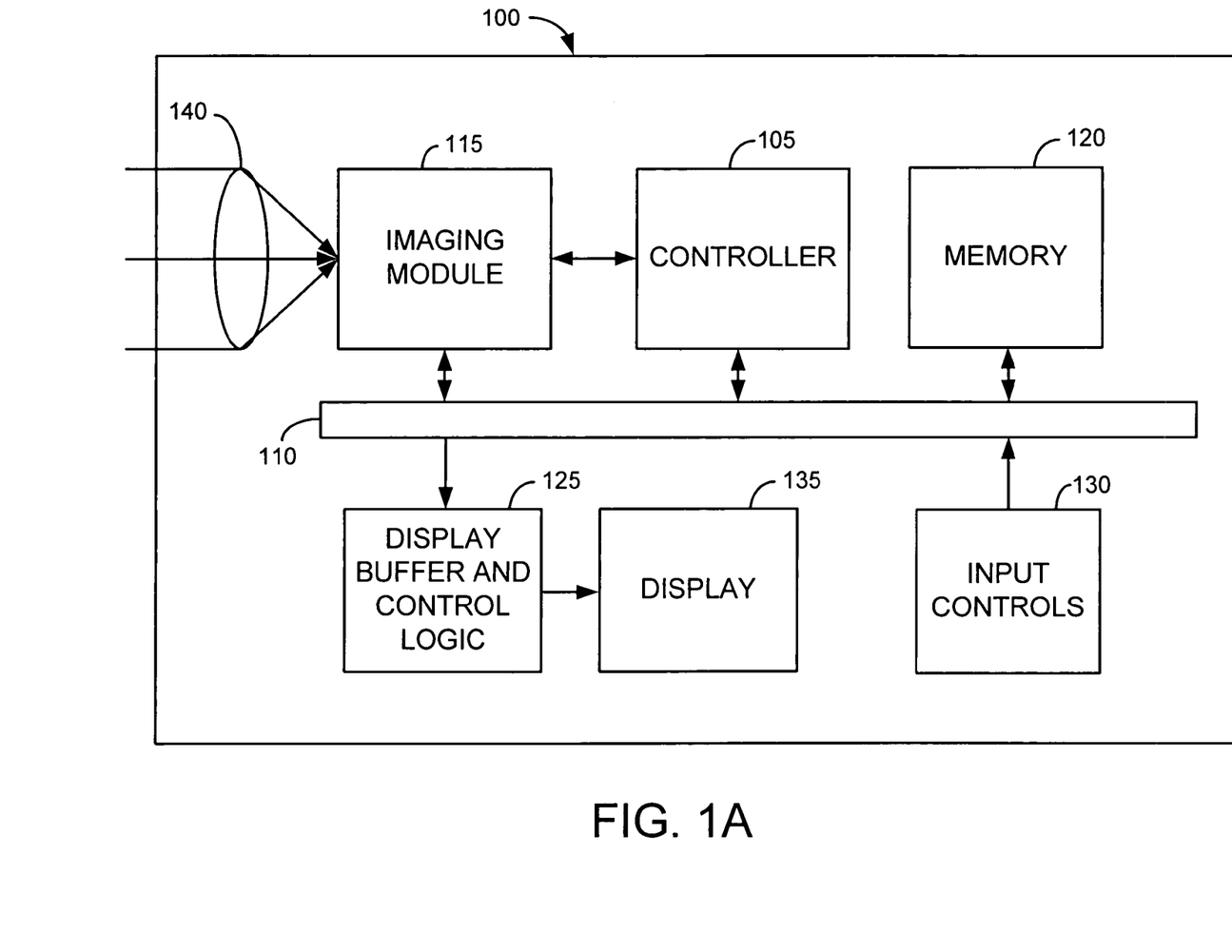
FIG. 1A is a functional block diagram of a digital imaging device in accordance with an illustrative embodiment of the invention.

FIG. 1A is a functional block diagram of a digital imaging device 100 in accordance with an illustrative embodiment of the invention. Digital imaging device 100 may be any device capable of converting an optical image of a scene to a digital image. Examples include, without limitation, digital cameras, digital camcorders, personal digital assistants (PDAs) with digital camera functionality, and radiotelephones (e.g., cellular or PCS phones) with digital camera functionality. In FIG. 1A, controller 105 (e.g., a microprocessor or microcontroller) may communicate over data bus 110 with imaging module 115, memory 120, display buffer and control logic 125, and input controls 130. Display buffer and control logic 125 is in turn interfaced with display 135. Display 135 may be, for example, a liquid crystal display (LCD). Optical system 140 produces optical images that are converted to digital images by imaging module 115. Input controls 130 may include a shutter button, navigational buttons for browsing menus and captured digital images, and other input controls for controlling the operation of digital imaging device 100.

Figure 1B:
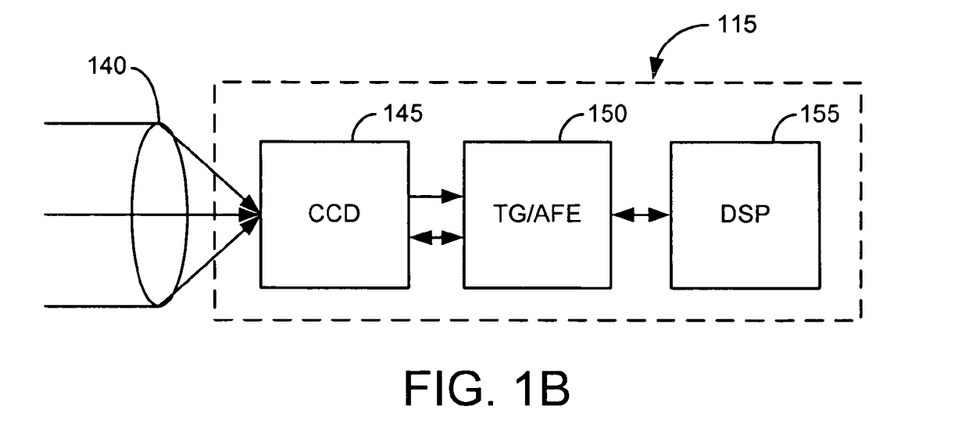
FIG. 1B is a functional block diagram of an imaging module of the digital imaging device shown in FIG. 1A in accordance with an illustrative embodiment of the invention.

FIG. 1B is a functional block diagram of imaging module 115 in accordance with an illustrative embodiment of the invention. Imaging module 115 may comprise a CCD sensor array 145, a timing generator/analog front end (TG/AFE) 150, and a digital signal processor (DSP) 155. As indicated in FIG. 1A, imaging module 115, via DSP 155, may, in some embodiments, communicate directly with controller 105. As indicated in FIG. 1B, both data and control signals connect imaging sensor 145 and TG/AFE 150.

Figure 1C:
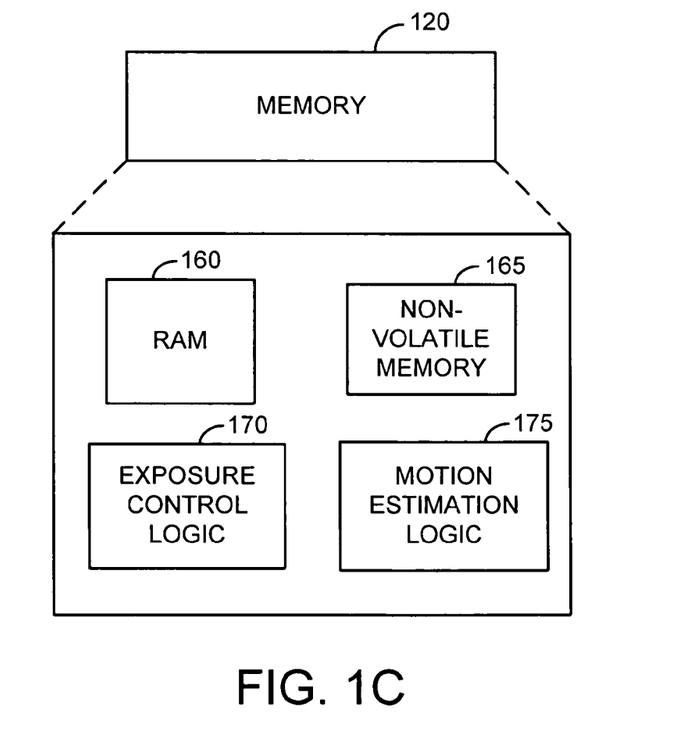
FIG. 1C is a functional diagram of a memory of the digital imaging device shown in FIG. 1A in accordance with an illustrative embodiment of the invention.

FIG. 1C is a functional diagram of memory 120 in accordance with an illustrative embodiment of the invention. Memory 120 may comprise random access memory (RAM) 160, non-volatile memory 165, exposure control logic 170, and motion estimation logic 175. In some applications, non-volatile memory 165 may be of the removable variety (e.g., a secure digital or multi-media memory card). Exposure control logic 170 and motion estimation logic 175 will be explained in greater detail in later portions of this detailed description. In general, the functionality of exposure control logic 170 and motion estimation logic 175 may be implemented in software, firmware, hardware, or any combination of thereof. For example, exposure control logic 170 and motion estimation logic 175 may be firmware that is executed by controller 105.

Figure 2A:
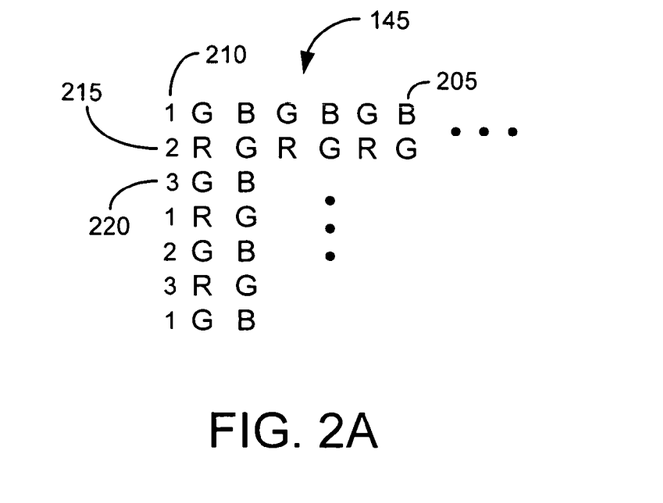
FIG. 2A is an illustration of a portion of a Bayer pattern associated with an imaging sensor in accordance with an illustrative embodiment of the invention.

FIG. 2A is an illustration of a portion of a Bayer pattern associated with CCD sensor array 145 in accordance with an illustrative embodiment of the invention. As shown in FIG. 2A, CCD sensor array 145 has a plurality of fields. A "field" may be defined as a set of rows of photosensors ("row set") that may be read out of CCD sensor array 145 as a unit. The fields, taken together, constitute an image "frame." In the example shown in FIG. 2A, CCD sensor array 145 has three fields (210, 215, and 220), which are labeled Field 1, Field 2, and Field 3, respectively, in FIG. 2A. A CCD sensor array 145 in accordance with the principles of the invention may, in general, have one or more fields. The letters "R," "G," and "B," in FIG. 2A stand for, respectively, red, green, and blue color channels. Through the use of filters (not shown in FIG. 2A), each pixel 205 is made sensitive to a specific one of the three colors.

A CCD sensor array in a conventional (prior-art) digital camera is typically operated as follows. All the fields of the CCD sensor array are simultaneously exposed to light for a predetermined period. Once the exposure is complete, one field of the CCD sensor array is transferred to an optically shielded shift register (sometimes called a "vertical shift register"). The field in the shift register is then clocked out of the device and stored in a memory external to the CCD sensor array. This process is repeated for each of the remaining fields of the CCD sensor array until all fields have been read from the CCD sensor array. The time required to transfer an entire field to the shift register is typically very brief (e.g., on the order of microseconds). However, the time required to clock data out of the shift register is typically much longer than the total exposure time. For example, though an exposure may be on the order of 1-10 ms, the time to read the image data associated with a single field from the shift register may be as long as 100 ms.

Figure 2B:
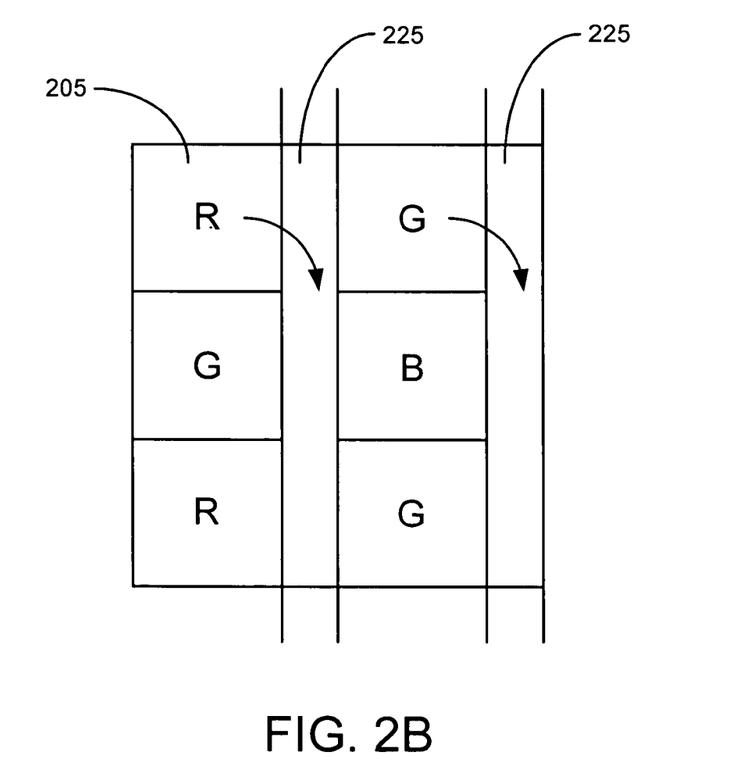
FIG. 2B is a diagram of a portion of a CCD sensor array in accordance with an illustrative embodiment of the invention.

FIG. 2B is a diagram of a portion of CCD sensor array 145 in accordance with an illustrative embodiment of the invention. As indicated in FIG. 2B, pixels 205 from a particular field (any one of the N fields of CCD sensor array 145, where N is an integer greater than or equal to one) may be transferred to optically shielded shift register ("shift register") 225. Shift register 225 may act, in effect, as an additional one-field memory in which an entire field of CCD sensor array 145 may be stored until another field must be loaded into shift register 225. This aspect of CCD sensor array 145 may be exploited as shown in FIGS. 3A and 3B.

Figure 3A:
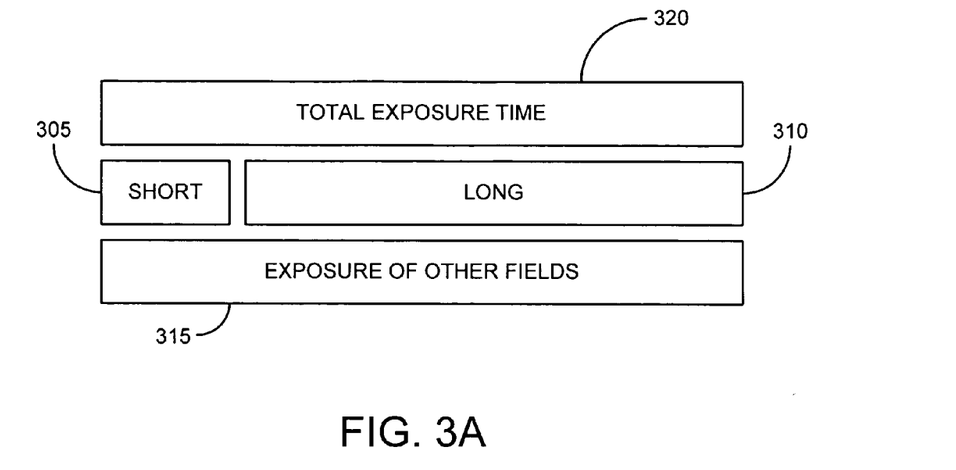
FIGS. 3A and 3B are diagrams showing short and long exposures of a particular field of a CCD sensor array in accordance with an illustrative embodiment of the invention.
Figure 3B:
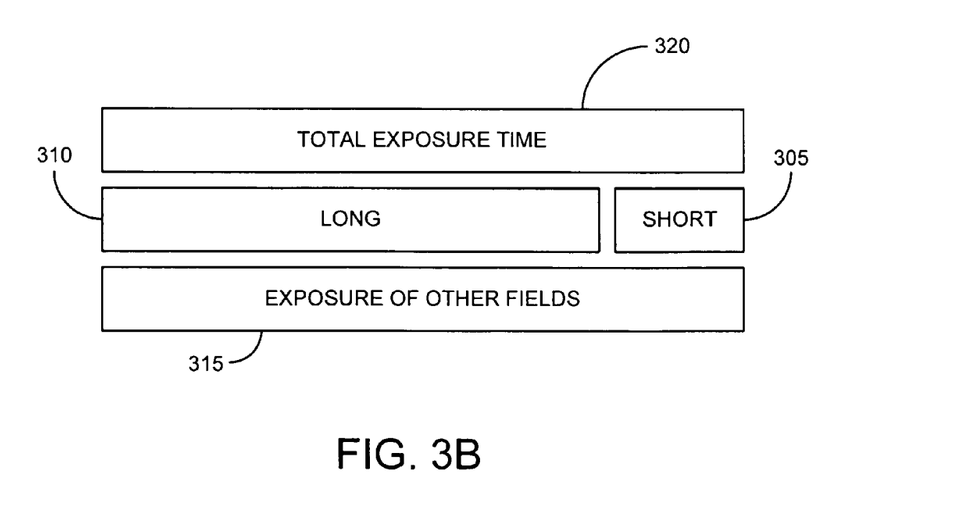

FIGS. 3A and 3B are diagrams showing both short and long exposures of a particular field of a CCD sensor array 145 in accordance with an illustrative embodiment of the invention. In FIG. 3A, a particular field of CCD sensor array 145 is first exposed for a short period 305. The choice of "particular field" is arbitrary; it may be any one of the N fields of CCD sensor array 145, including the only field of CCD sensor array 145, if CCD sensor array has only one field. For example, the particular field may be Field 1 (210). The image data resulting from the short exposure of the particular field may be transferred to shift register 225, and the same particular field may be re-exposed for a long period 310 (i.e., a period that is long relative to short period 305). As indicated in FIG. 3A, any fields of CCD sensor array 145 other than the particular field may be exposed for a period 315 that equals the total exposure time 320 of the digital image. Once total exposure time 320 has elapsed, the image data associated with short period 305 resides in shift register 225, the image data associated with long period 310 resides in the photosensors of the particular field, and the image data associated with any fields other than the particular field reside in their respective photosensors. Therefore, the image data from the short exposure of the particular field may be read from shift register 225, the image data from the long exposure of the particular field may be transferred to shift register 225, the image data from the long exposure of the particular field may be read from shift register 225, and the process may be repeated for any fields other than the particular field until the entire digital image has been read out of CCD sensor array 145.

FIG. 3B is analogous to FIG. 3A, except that the order of short period 305 and long period 310 has been reversed, illustrating that the short and long exposures of the particular field may be performed in either order.

Figure 3C:
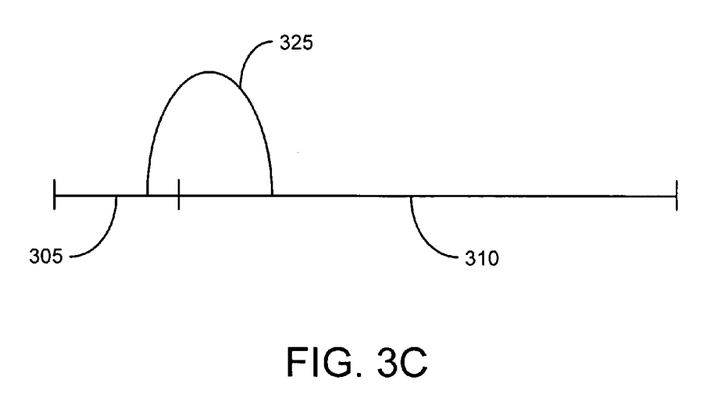
FIG. 3C is a diagram showing a strobe pulse that straddles a portion of both a short exposure and a long exposure of a particular field of a CCD sensor array in accordance with an illustrative embodiment of the invention.
Figure 3D:
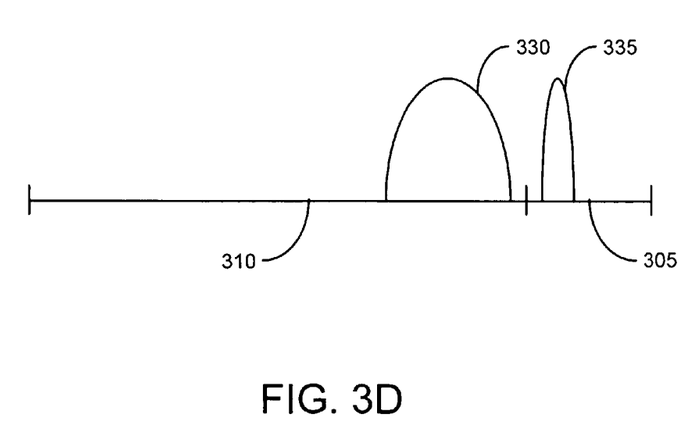
FIG. 3D is a diagram showing separate strobe pulses during, respectively, a long exposure and a short exposure of a particular field of a CCD sensor array in accordance with another illustrative embodiment of the invention.

FIG. 3C is a diagram in which a strobe pulse 325 straddles a portion of both short period 305 and long period 310, in accordance with an illustrative embodiment of the invention. Use of a strobe with digital imaging device 100 is optional but may be advantageous in some applications. In FIG. 3D, a first strobe pulse 330 is emitted during the first exposure of the particular field (in this example, the longer exposure), and a second strobe pulse 335 is emitted during the second exposure of the particular field (in this example, the short exposure), in accordance with an illustrative embodiment of the invention. First strobe pulse 330 and second strobe pulse 335 may be of unequal duration, energy, or both (unequal duration is indicated in FIG. 3D).

Figure 4A:
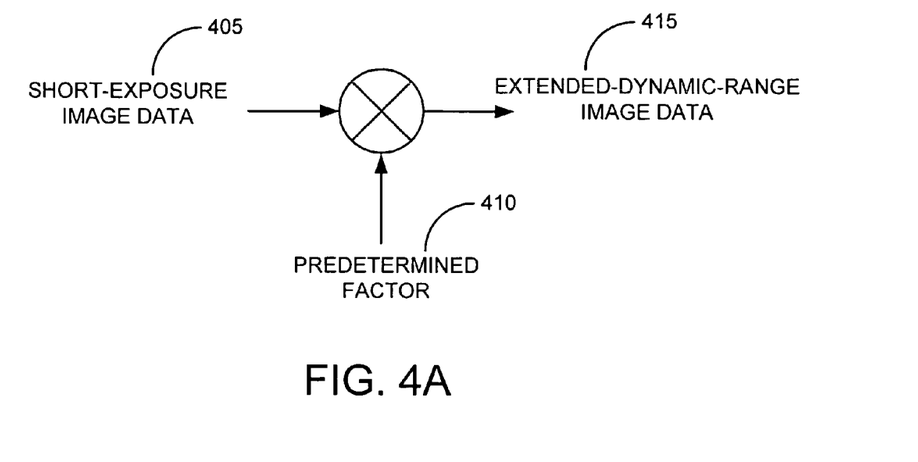
FIG. 4A is a block diagram of the extension of the dynamic range of clipped image data in accordance with an illustrative embodiment of the invention.

By making long period 310 a predetermined factor times short period 305, the image data from the short exposure of the particular field ("short-exposure image data") may be used to extend the dynamic range of clipped image data in the long exposure of the particular field ("long-exposure image data"). This is illustrated in FIG. 4A, in which short-exposure image data 405 is multiplied by predetermined factor 410 to produce extended-dynamic-range image data 415. For example, if the predetermined factor 410 is eight (i.e., long period 310 is eight times as long as short period 305), pixels in short-exposure image data 405 corresponding spatially to clipped pixels in the long-exposure image data may be multiplied by eight (predetermined factor 410) to estimate (extrapolate) what the clipped pixels would have been had they not overflowed. In this example, the dynamic range of the clipped pixels would effectively be extended by up to three bits. In general, if the predetermined factor 410 equals X, where X is a power of two that is greater than or equal to two, the dynamic range may be extended by $\log_2(X)$ bits using this technique.

In some embodiments, the short-exposure image data 405 and the long-exposure image data may be combined (e.g., scaled and added together) to form a single field (a "combined particular field") before clipped pixels are identified in the various fields of CCD sensor array 145 and the dynamic range of clipped pixels is extended using short-exposure image data 405. In such an embodiment, the combined particular field may be treated the same as the other fields of CCD sensor array 145. If clipped image data is found in the combined particular field, short-exposure image data 405 may be used to extend the dynamic range of that clipped image data.

Figure 4B:
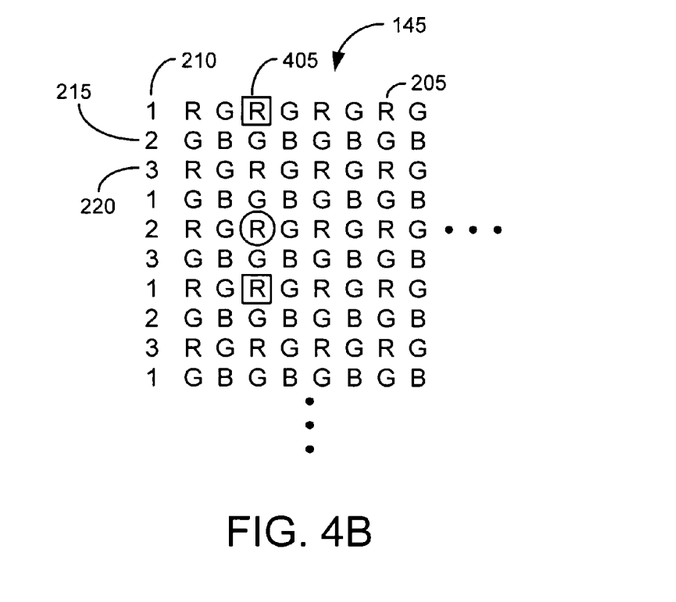
FIG. 4B is an illustration showing how, through interpolation, short-exposure image data can be used to extend the dynamic range of image data in fields of a CCD sensor array other than the particular field, in accordance with an illustrative embodiment of the invention.

Short-exposure image data 405 may also be used to extend the dynamic range of clipped image data in fields other than the particular field, if CCD sensor array 145 has more than one field. Those skilled in the art will recognize that this requires interpolation, but interpolation techniques are well known in the digital image processing art. FIG. 4B is an illustration of a portion of a Bayer pattern associated with CCD sensor array 145 in accordance with an illustrative embodiment of the invention. In the example of FIG. 4B, it is assumed, without loss of generality, that the particular field is Field 1 (210). If the circled "R" (red) pixel in Field 2 has clipped, the two boxed red pixels of the short-exposure image data 405 of Field 1 210 may be multiplied by the predetermined factor 410 and used to interpolate a value for the clipped (circled) red pixel in Field 2. For example, the red pixel in Field 1 that lies below the circled pixel in Field 2 may be scaled by the predetermined factor 410 and weighted ⅔, and the red pixel in Field 1 that lies above (and somewhat farther from) the circled pixel in Field 2 may be scaled by the predetermined factor 410 and weighted ⅓. The scaled and weighted red pixels from Field 1 210 (part of short-exposure image data 405) may then be added together to form an estimate of the clipped red pixel in Field 2. Many other interpolation schemes are possible, all of which are considered to be within the scope of the invention as claimed.

Figure 5A:
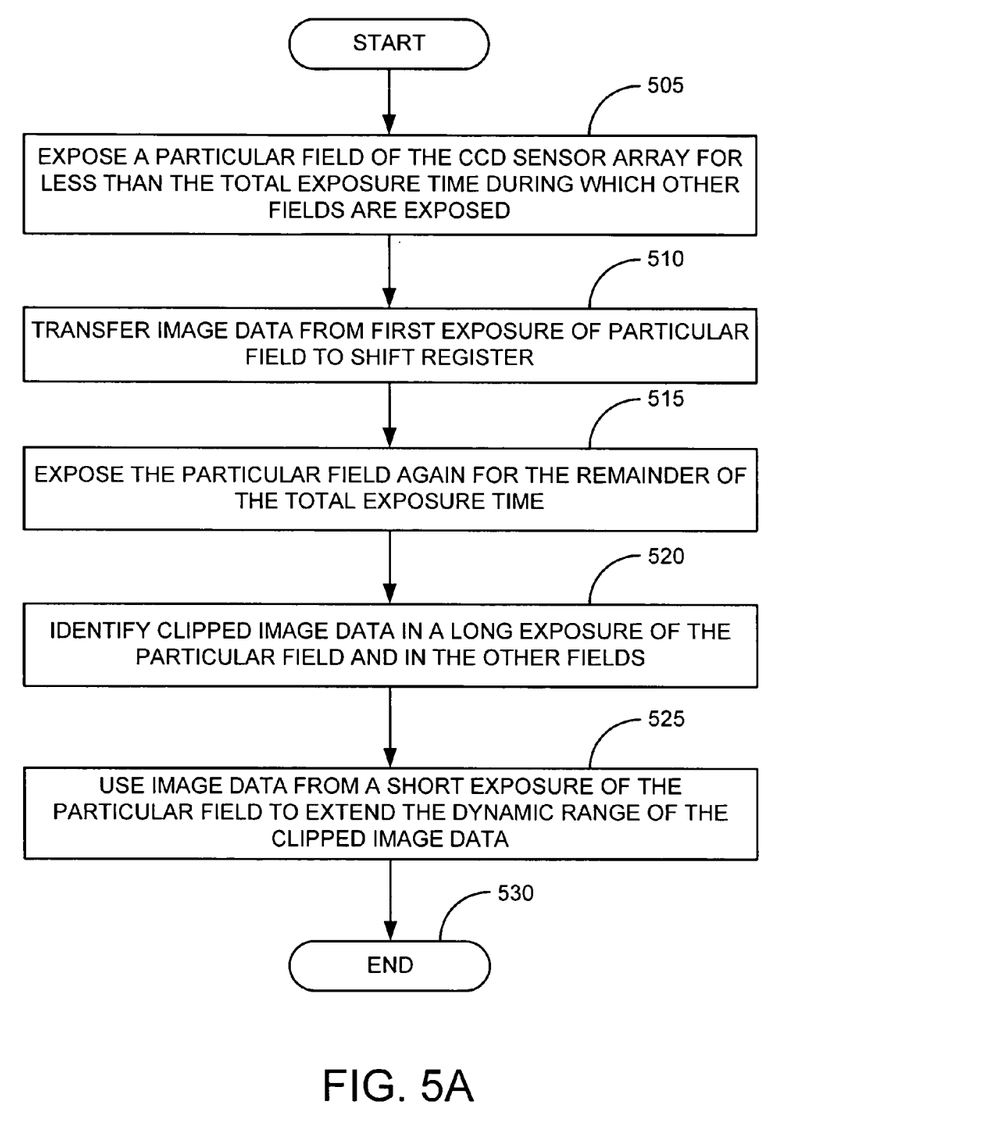
FIG. 5A is a flowchart of a method for correcting exposure in a digital imaging device in accordance with an illustrative embodiment of the invention.

FIG. 5A is a flowchart of a method for correcting exposure in a digital imaging device in accordance with an illustrative embodiment of the invention. At 505, exposure control logic 170 causes a particular field of the N fields of CCD sensor array 145 (N greater than or equal to one) to be exposed for less than the total exposure time 320 during which other fields, if any, of CCD sensor array 145 are exposed. This first exposure of the particular field may be either short or long relative to a subsequent exposure of the particular field, as explained above. At 510, exposure control logic 170 transfers to shift register 225 the image data from the exposure of the particular field at step 505. At 515, exposure control logic may expose the particular field for the remainder of the total exposure time. This second exposure of the particular field may be either short or long relative to the first exposure at step 505, as explained above. Exposure control logic 170 may identify clipped image data in the long exposure of the particular field (or, optionally, in a combined particular field) and in any fields of CCD sensor array 145 other than the particular field at 520. Exposure control logic 170 may use short-exposure image data 405 (from step 505 or step 515, depending on the order in which the short and long exposures are generated) to extend the dynamic range of the clipped image data at 525. As explained above, this may involve multiplying short-exposure image data 405 by the predetermined factor 410 and the use of interpolation techniques, as explained in connection with FIG. 4B. At 530, the process may terminate.

Figure 5B:
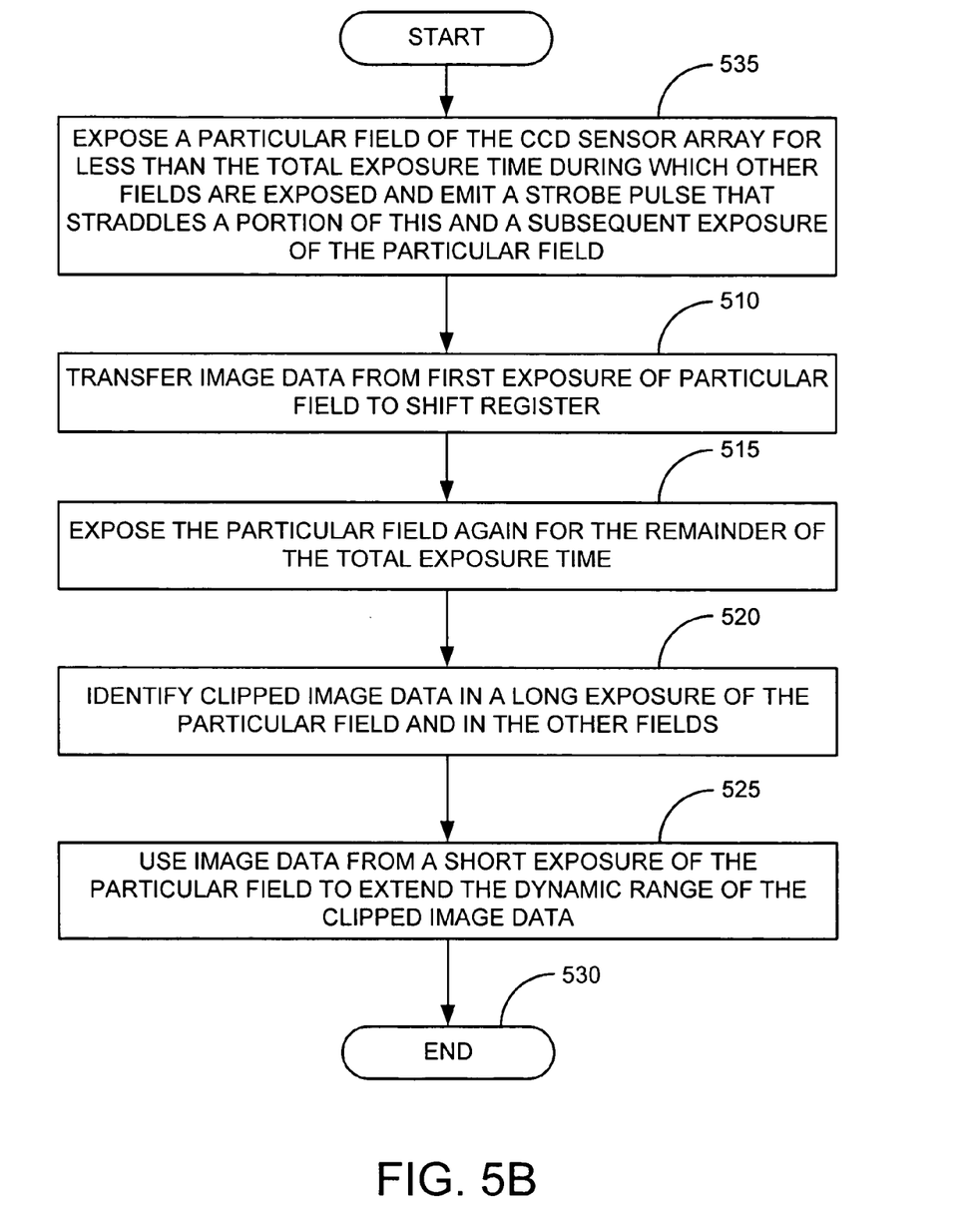
FIG. 5B is a flowchart of a method for correcting exposure in a digital imaging device in accordance with another illustrative embodiment of the invention.

FIG. 5B is a flowchart of a method for correcting exposure in a digital imaging device in accordance with another illustrative embodiment of the invention. In this particular embodiment, exposure control logic 170 triggers a strobe pulse 325 at 535 (during the first exposure of the particular field) that straddles a portion of both short period 305 and long period 310, as explained in connection with FIG. 3C. The method is otherwise the same as in FIG. 5A. In firing strobe pulse 325, exposure control logic 170 may cause the ratio of the strobe pulse energy that occurs within long period 310 to the strobe pulse energy that occurs within short period 305 to be approximately equal to the predetermined factor 410. In that way, both the exposure time and strobe illumination of the long-exposure image data are the predetermined factor 410 times those of the short-exposure image data 405, facilitating the extension of the dynamic range of clipped image data as explained above.

Figure 5C:
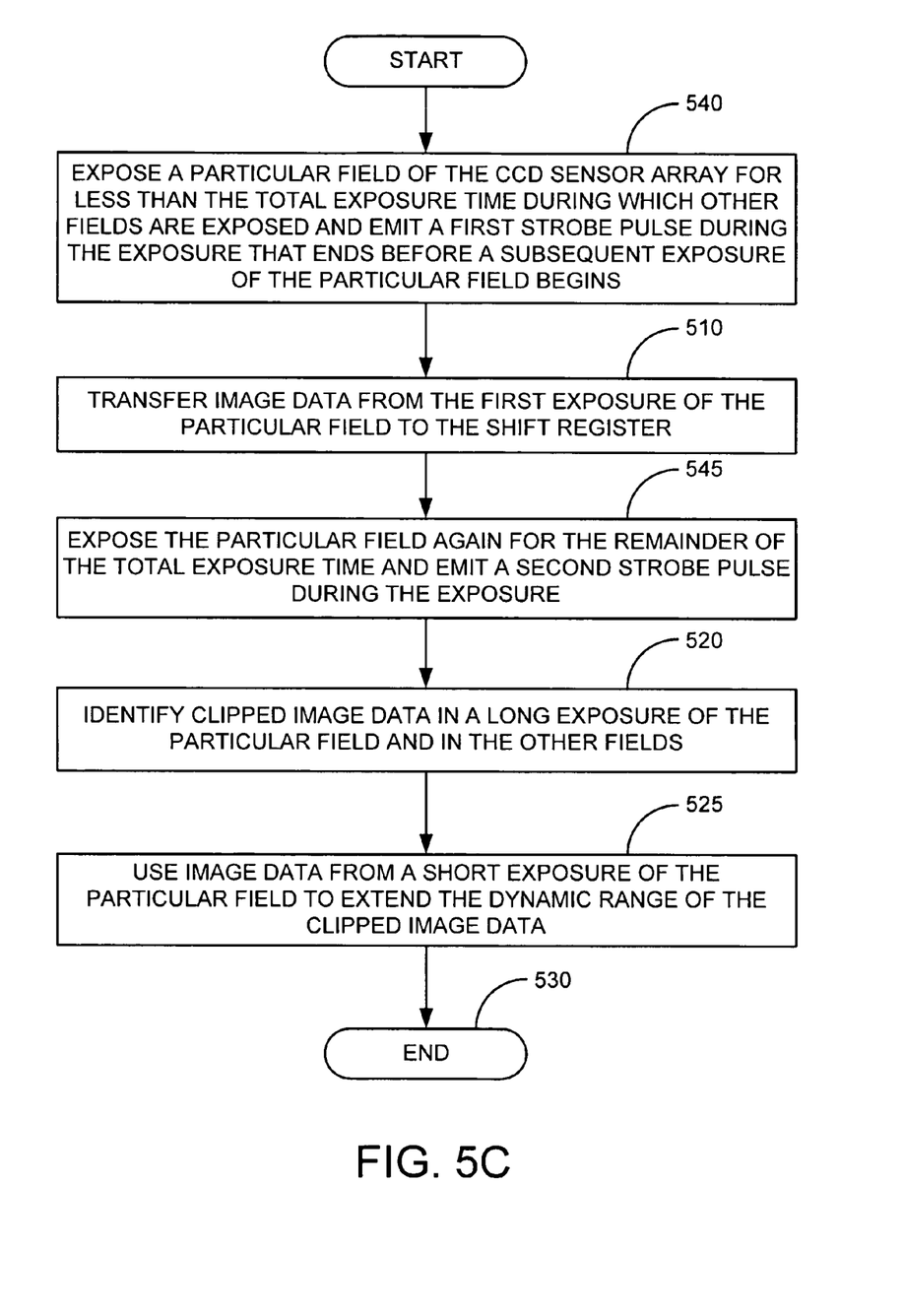
FIG. 5C is a flowchart of a method for correcting exposure in a digital imaging device in accordance with yet another illustrative embodiment of the invention.

FIG. 5C is a flowchart of a method for correcting exposure in a digital imaging device in accordance with yet another illustrative embodiment of the invention. The method shown in FIG. 5C includes the use of two separate strobe pulses (330 and 335), as explained in connection with FIG. 3D. At 540 (during the first exposure of the particular field), exposure control logic 170 may fire a first strobe pulse 330 that terminates approximately at the end of the first exposure of the particular field (i.e., approximately at the end of short period 305 or long period 310, whichever occurs first). At 545, exposure control logic may fire a second strobe pulse 335 that commences approximately at the beginning of the second exposure of the particular field (i.e., approximately at the beginning of short period 305 or long period 310, whichever occurs second). As explained above, the first and second strobe pulses (330 and 335, respectively) may be of unequal duration, energy, or both. For example, the energy associated with the longer of the two strobe pulses 330 and 335 may be approximately the predetermined factor 410 times that of the shorter of the two strobe pulses 330 and 335. The longer of the two strobe pulses 330 and 335 may optionally occur within long period 310, and the shorter of the two strobe pulses 330 and 335 may optionally occur within short period 305.

If exposure correction (dynamic range extension of clipped image data) is performed on non-de-mosaicked image data as indicated above, any downstream de-mosaicking algorithm in digital imaging device 100 may remain unaltered (aside from being able to handle additional bits per pixel created by dynamic range extension).

Optionally, after dynamic range extension of clipped image data, the dynamic range of the uncompressed image data may be compressed in a controlled manner that preserves the proper color ratios, as is well known in the digital photography art. For example, in extending the dynamic range of clipped image data, nominal 12-bit image data may get extended to 15 bits (predetermined factor 410 of eight), from which 8-bit compressed image data is ultimately derived. For example, Joint Photographic Experts Group (JPEG) digital images are typically 24 bits per pixel (8 bits per color channel), and the sRGB standard used by JPEG specifies a gamma function of 2.2, which compresses the dynamic range.

Optionally, the short-exposure image data 405 and the long-exposure image data may be captured at different aperture settings to allow the depth of field of the resulting digital image to be manipulated. Likewise, the short-exposure image data 405 and the long-exposure image data may optionally be captured at different focus settings to allow the depth of field of the resulting digital image to be manipulated. Since both short period 305 and long period 310 are shorter than total exposure time 320, the short-exposure image data 405 and the long-exposure image data, respectively, may optionally be read from CCD sensor array 145 with different amounts of gain, potentially increasing the intensity resolution of the image data from the particular field.

The technique of using shift register 225 to store an extra exposure of a particular field of CCD sensor array 145 may also be applied to the problem of motion estimation. If motion within a single frame can be estimated, deblurring algorithms that are well known in the image processing art may be applied to a digital image to reduce the effect of blurring. Such blurring may be the result of camera motion, object motion, or both.

Figure 6:
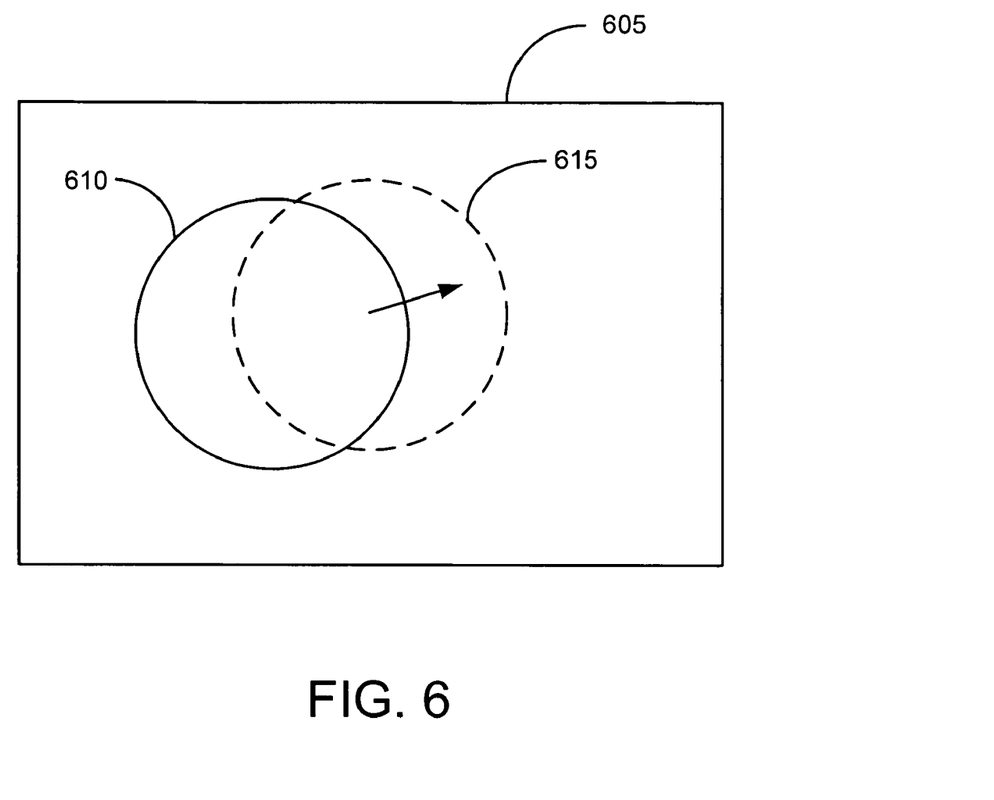
FIG. 6 is an illustration of motion between separate exposures of a particular field of a CCD sensor array in accordance with an illustrative embodiment of the invention.

FIG. 6 is an illustration of motion between separate exposures of a particular field of CCD sensor array 145 in accordance with an illustrative embodiment of the invention. The separate exposures of the particular field (short-exposure image data 405 and long-exposure image data) may be captured in the same manner as described above in connection with exposure correction. In FIG. 6, a first exposure 610 of the particular field comprises an image of an object (here, a simple circle) at a first position. A second exposure 615 of the particular field (represented by the dashed circle in FIG. 6) comprises the same object at a second position within a single image "frame." In any fields of CCD sensor array 145 other than the particular field (and in any exposure of the particular field that is sufficiently long), this object motion will manifest itself as blurring.

As with exposure correction, it may be advantageous to capture both a short and a long exposure of the particular field. The short exposure will more effectively "freeze" motion than the longer exposure, aiding subsequent motion estimation. Motion may also be "frozen" by firing a strobe pulse during one of the exposures of the particular field. For example, in one embodiment, the strobe pulse may be emitted during whichever exposure of the particular field is generated first. In another embodiment, the strobe pulse may be emitted during whichever exposure of the particular field is generated second.

Figure 7A:
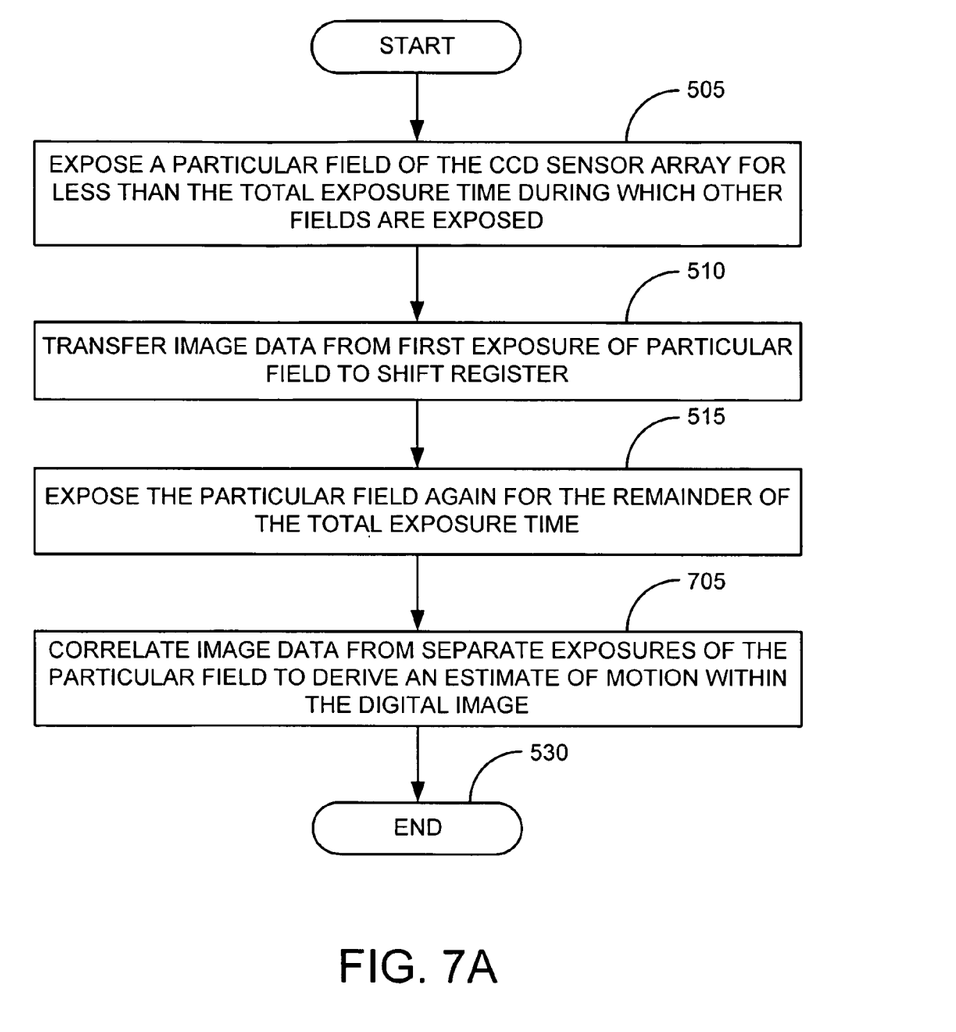
FIG. 7A is a flowchart of a method for estimating motion in a digital image in accordance with an illustrative embodiment of the invention.

FIG. 7A is a flowchart of a method for estimating motion in a digital image in accordance with an illustrative embodiment of the invention. Steps 505 through 515 (involving the capture of short-exposure image data 405 and long-exposure image data) correspond to those in FIG. 5A. As with exposure correction, short period 305 and long period 310 may occur in either order. Once short-exposure image data 405 and long-exposure image data have been captured, motion estimation logic 175 may, at 705, correlate short-exposure image data 405 and long-exposure image data to estimate the motion within the image frame. For example, motion estimation logic 175 may derive a motion vector that describes how digital imaging device 100 or objects within the scene moved between the first and second exposures of the particular field.

Motion estimation algorithms may be relatively simple or quite complex. One example of sophisticated motion estimation well known in the video encoding art is that implemented in connection with the Moving Pictures Expert Group (MPEG) video compression standards. The sophisticated motion estimation techniques used in connection with MPEG compression may improve the performance of motion estimation. Such improvements may include, for example, a fast search algorithm or an efficient computational scheme that facilitates the correlation of short-exposure image data 405 and long-exposure image data at step 705. One example of sophisticated MPEG motion estimation may be found in U.S. Pat. No. 6,480,629, the disclosure of which is incorporated herein by reference. In some embodiments, motion estimation logic 175 may identify highlights (bright areas) within the digital image and correlate short-exposure image data 405 and long-exposure image data within local regions surrounding the identified highlights.

As explained above, the motion estimate derived at 705 may serve as input to a subsequent deblurring algorithm.

Figure 7B:
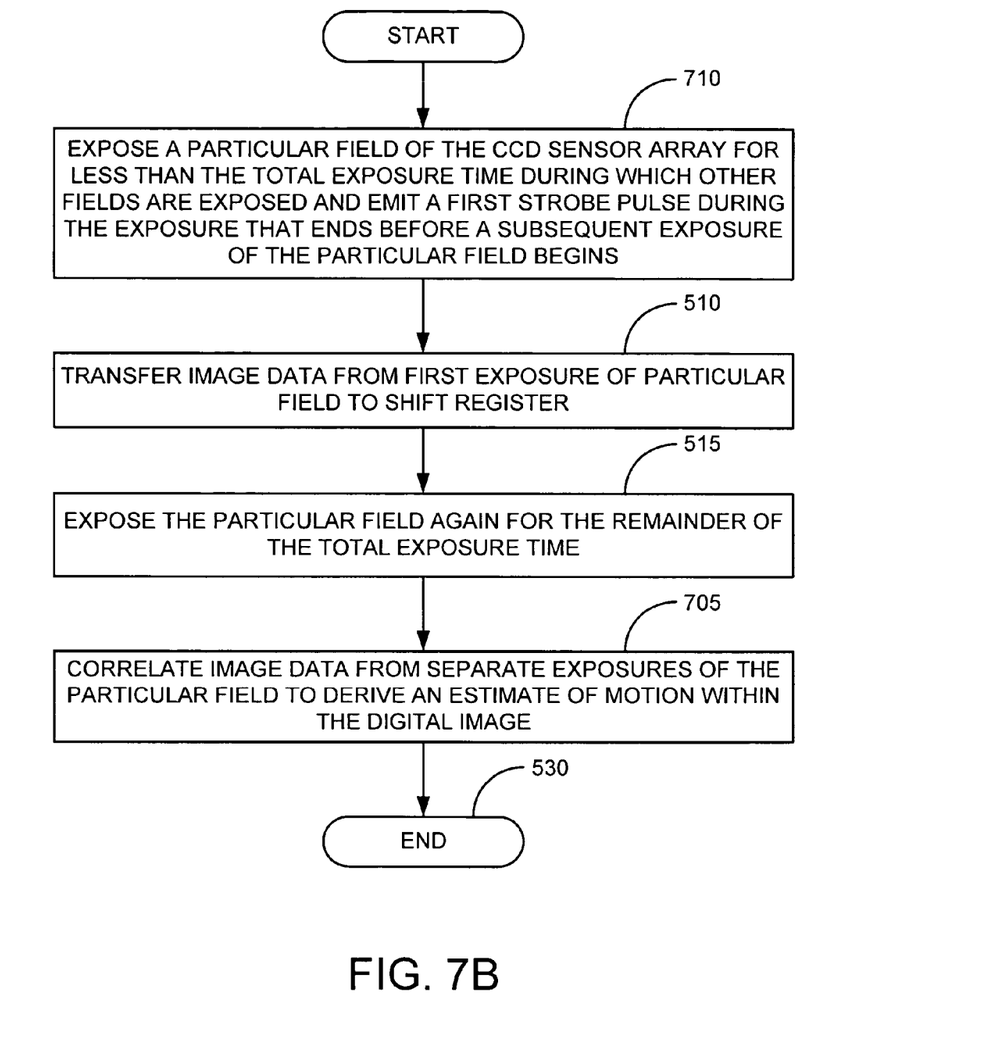
FIG. 7B is a flowchart of a method for estimating motion in a digital image in accordance with another illustrative embodiment of the invention.

FIG. 7B is a flowchart of a method for estimating motion in a digital image in accordance with another illustrative embodiment of the invention. The method shown in FIG. 7B differs from that of FIG. 7A at step 710 (analogous to step 540 in FIG. 5C), in which a strobe pulse is fired during the first exposure of the particular field, which exposure may be long or short relative to a subsequent exposure of the particular field, as explained above. As mentioned above, the strobe pulse may instead be fired during the second exposure of the particular field.

In some embodiments, exposure correction and motion estimation may both be performed in digital imaging device 100 using the same short-exposure image data 405 and long-exposure image data. In other embodiments, only one of the two techniques is deployed in digital imaging device 100.

Though the embodiments described above employ a CCD sensor array, any imaging sensor having equivalent functionality (i.e., at least one field and the capability of storing more than one exposure of a particular field during a single exposure cycle) may be used in implementing the invention.

The foregoing description of the present invention has been presented for the purposes of illustration and description. It is not intended to be exhaustive or to limit the invention to the precise form disclosed, and other modifications and variations may be possible in light of the above teachings. The embodiments were chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. A method for estimating motion within a digital image captured by a digital imaging device, comprising:

during a single exposure cycle for capturing a single image frame:
exposing a particular field of a CCD sensor array for a short period to produce short-exposure image data, the CCD sensor array having at least one field and an optically shielded shift register that is capable of holding an entire field;
exposing the particular field for a long period to produce long-exposure image data, the long period being a predetermined factor times the short period, where the short period and the long period are within the single exposure cycle;
transferring to the optically shielded shift register whichever of the short-exposure data and the long-exposure data are produced first;
exposing any other fields of the CCD sensor array other than the particular field throughout the short and long periods, the digital image being comprised of image data from at least one field; and
correlating the short-exposure image data and the long-exposure image data to derive an estimate of motion within the digital image.

2. The method of claim 1, wherein the short-exposure image data and the long-exposure image data are correlated within at least one local region of the digital image that surrounds a bright area.

3. The method of claim 1, further comprising:
firing a strobe during either the short or long periods.

4. A method for a digital imaging device where the digital imaging device includes an image sensor array comprising a plurality of sensor rows, the method comprising:
selecting a sensor row from the plurality of sensor rows;
beginning an image capture by exposing the image sensor array to light from a start time to an end time;
during the image capture:
transferring signals out from the selected sensor row prior to the end time to obtain a first image data from the selected sensor row;
continue exposing the image sensor array until the end time, and transferring signals out from the plurality of sensor rows to obtain image data for a single Image frame, where the signals transferred from the selected sensor row form a second Image data; and
correlating the first image data and the second image data from the selected sensor row to derive an estimate of motion within a digital image captured by the image sensor array.

5. The method of claim 4 further comprising modifying the digital image to reduce blurring in accordance with the estimate of motion.

6. The method of claim 4 further comprising emitting a strobe light during the image capture prior to obtaining the first image data from the selected sensor row.

7. The method of claim 4 where the correlating includes correlating the first image data and the second image data within at least one local region of the digital image that surrounds a bright area.

8. A digital imaging device, comprising:
a phototsensor array comprising a plurality of sensor rows of photosensors;
a shift register configured to hold data from an entire sensor row; and
a controller configured to operate the digital imaging device for capturing a single image frame by:
  exposing the photosensor array from a start time to an end time defining a single exposure cycle;
  during the capturing, transferring signals from a selected sensor row to the shift register prior to the end time to obtain a first exposure data;
  after the end time, obtaining signals from the plurality of sensor rows to obtain the image frame where the signals obtained from the selected sensor row provides a second exposure data from the selected sensor row; and
  correlating the first exposure data and the second exposure data from the selected sensor row to determine motion data of how an object within the first exposure data and the second motion data moved therebetween.

9. The digital imaging device of claim 8 where the photosensor array includes a CCD sensor array.

10. The digital imaging device of claim 9 further including logic for reducing blurring of the single image frame based on the motion data.

11. An digital imaging device comprising:
an image sensor array including a plurality of sensor rows;
means for obtaining signals from a selected sensor row multiple times during a single image capture to obtain multiple data sets from the selected sensor row, and obtaining signals from the remaining sensor rows once during the single image capture; and
means for correlating the multiple data sets from the selected sensor row to derive an estimate of motion between the multiple data sets.

12. The digital imaging device of claim 11 where the image sensor array includes a CCD sensor array.

13. The digital imaging device of claim 11 further including:
means for generating a digital image from single image captured by the image sensor array; and
means for deblurring the digital image by modifying the digital image in accordance with the estimate of motion.

* * * * *

UNITED STATES PATENT AND TRADEMARK OFFICE
CERTIFICATE OF CORRECTION

PATENT NO. : 7,538,794 B2  Page 1 of 1
APPLICATION NO. : 11/048403
DATED : May 26, 2009
INVENTOR(S) : Richard Turley et al.

It is certified that error appears in the above-identified patent and that said Letters Patent is hereby corrected as shown below:

On the title page, in item (75), in "Inventors", delete "Dan Dalton" and insert -- Dan L. Dalton --, therefor.

In column 8, line 51, in Claim 4, delete "Image" and insert -- image --, therefor.

In column 8, line 53, in Claim 4, delete "Image" and insert -- image --, therefor.

Signed and Sealed this

Twenty-seventh Day of October, 2009

David J. Kappos
*Director of the United States Patent and Trademark Office*